Figure 27:
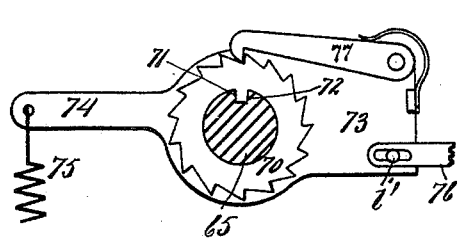

(No Model.)
12 Sheets—Sheet 1.
W. A. PENDRY.
BUTTON MAKING MACHINE.
No. 581,830.
Patented May 4, 1897.
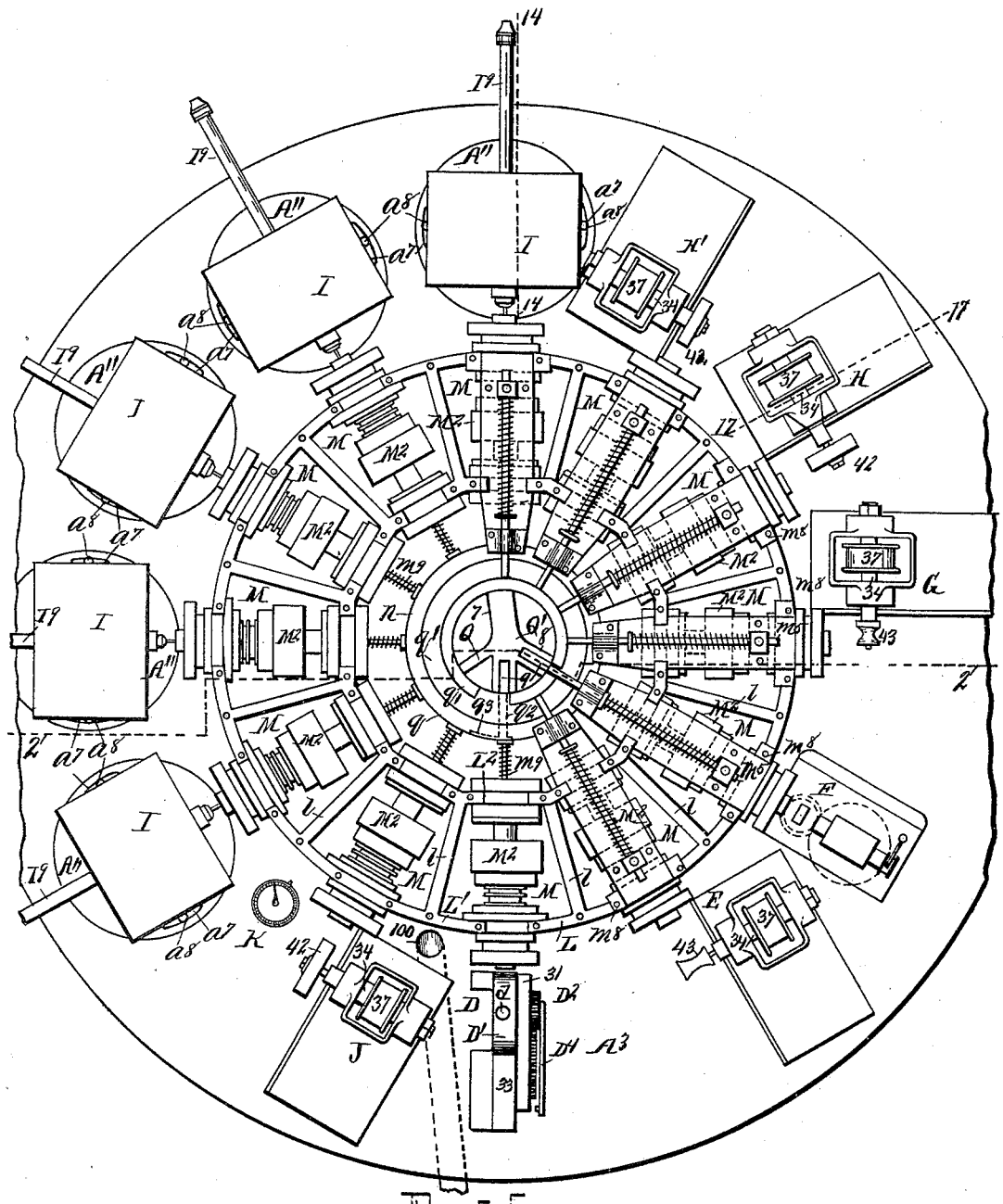
WITNESSES
O. B. Barnziger
M. A. Martin
INVENTOR
William A. Pendry
By his Attorney
Newell S. Wright (No Model.)  12 Sheets—Sheet 2.
W. A. PENDRY.
BUTTON MAKING MACHINE.
No. 581,830. Patented May 4, 1897.
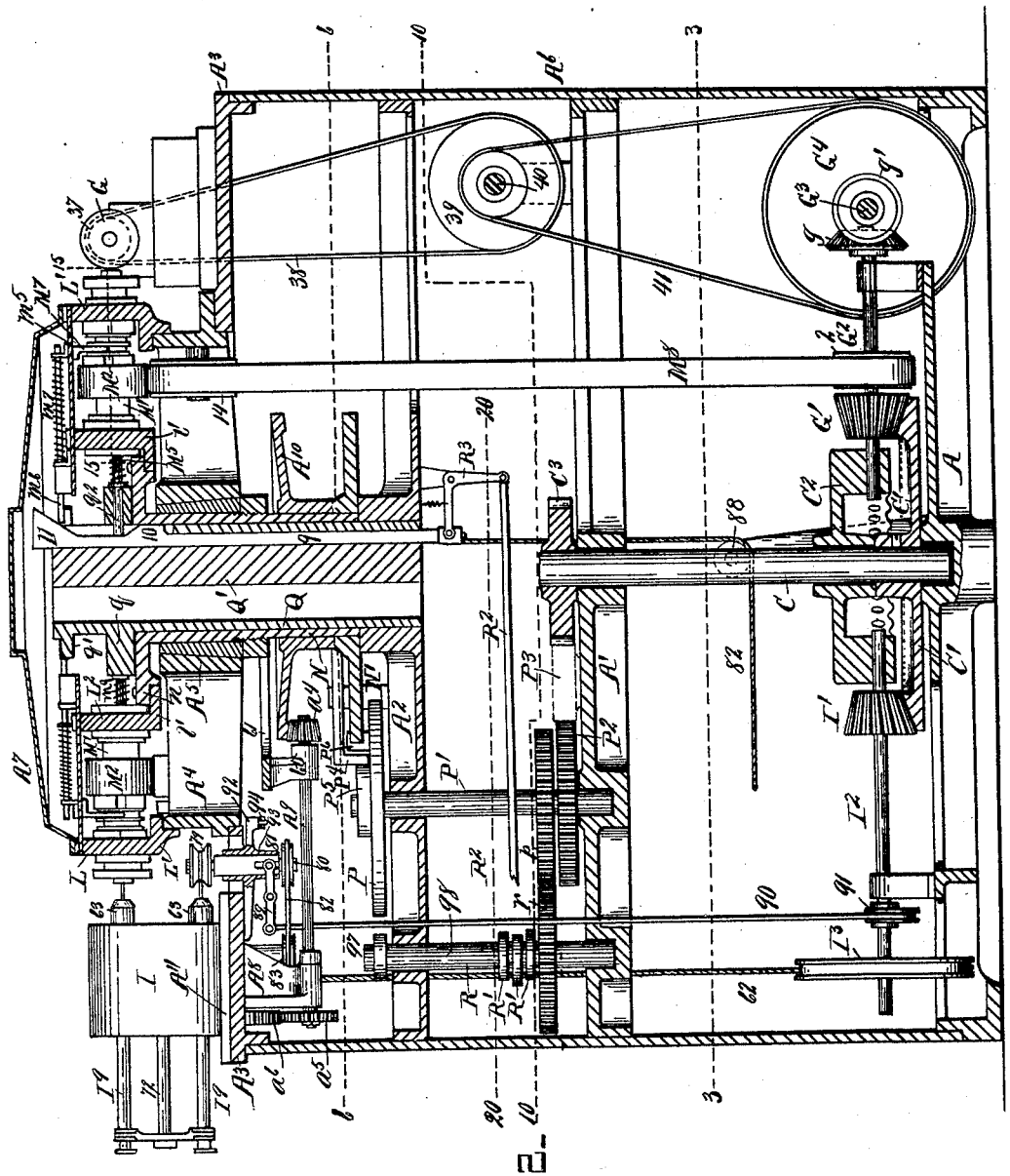
WITNESSES
INVENTOR
William A. Pendry
By his Attorney
Newell S. Wright (No Model.) 12 Sheets—Sheet 3.
W. A. PENDRY.
BUTTON MAKING MACHINE.
No. 581,830. Patented May 4, 1897.
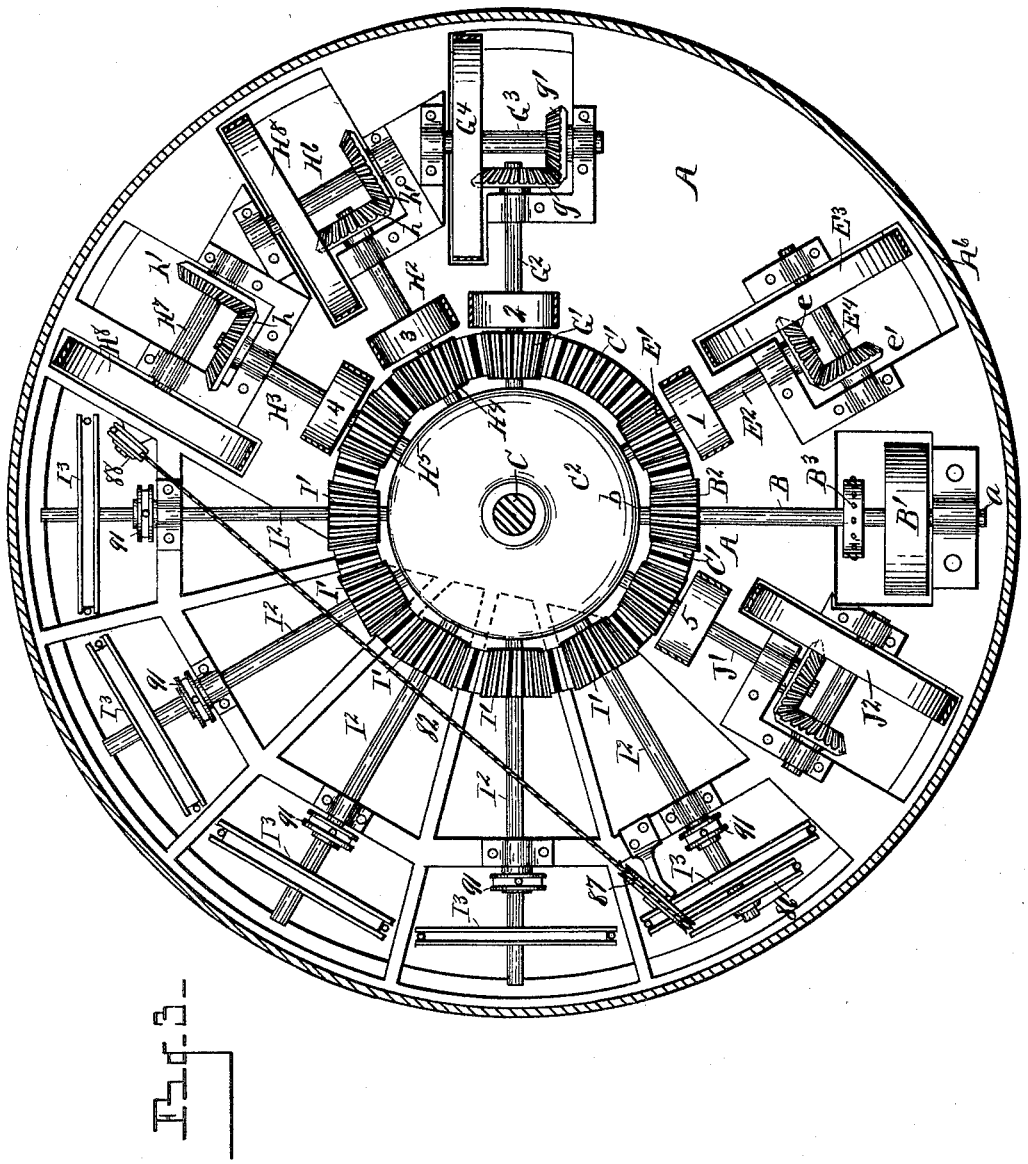
WITNESSES
O. B. Baenziger.
M. O. Martin.
INVENTOR
William A. Pendry
By his Attorney
Newell S. Wright (No Model.)  12 Sheets—Sheet 4.
W. A. PENDRY.
BUTTON MAKING MACHINE.
No. 581,830. Patented May 4, 1897.
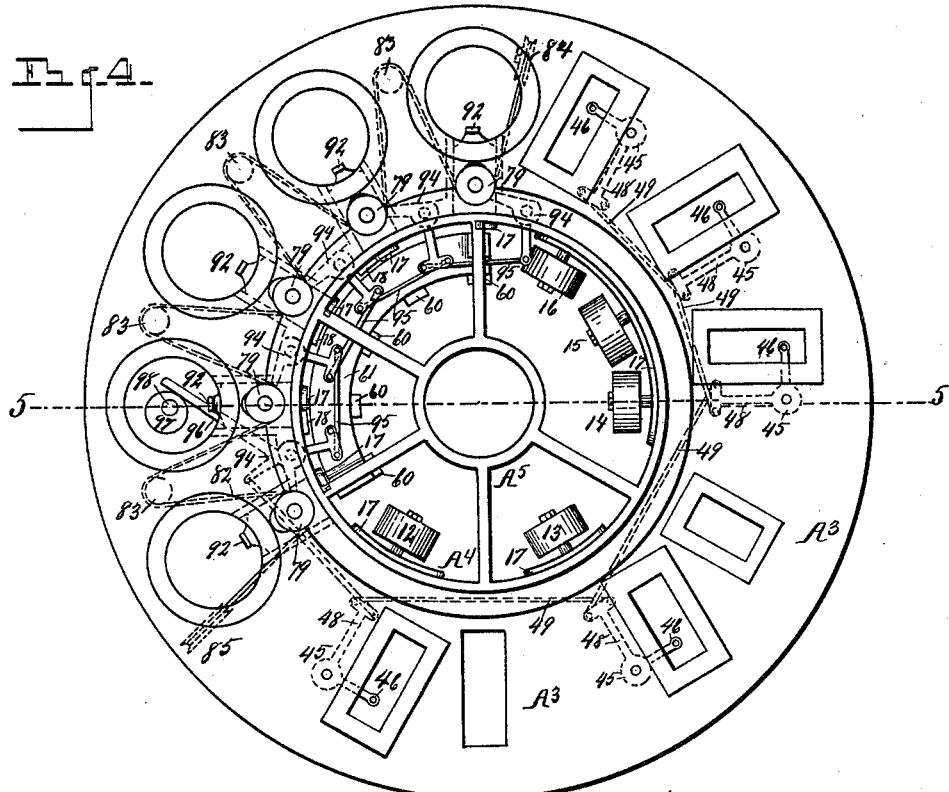
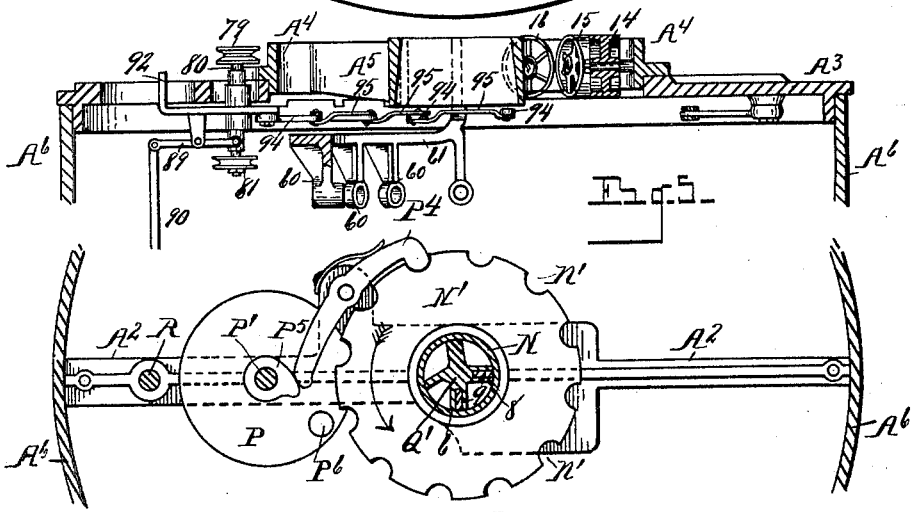
WITNESSES
INVENTOR
William A. Pendry
By his Attorney
Newell S. Wright

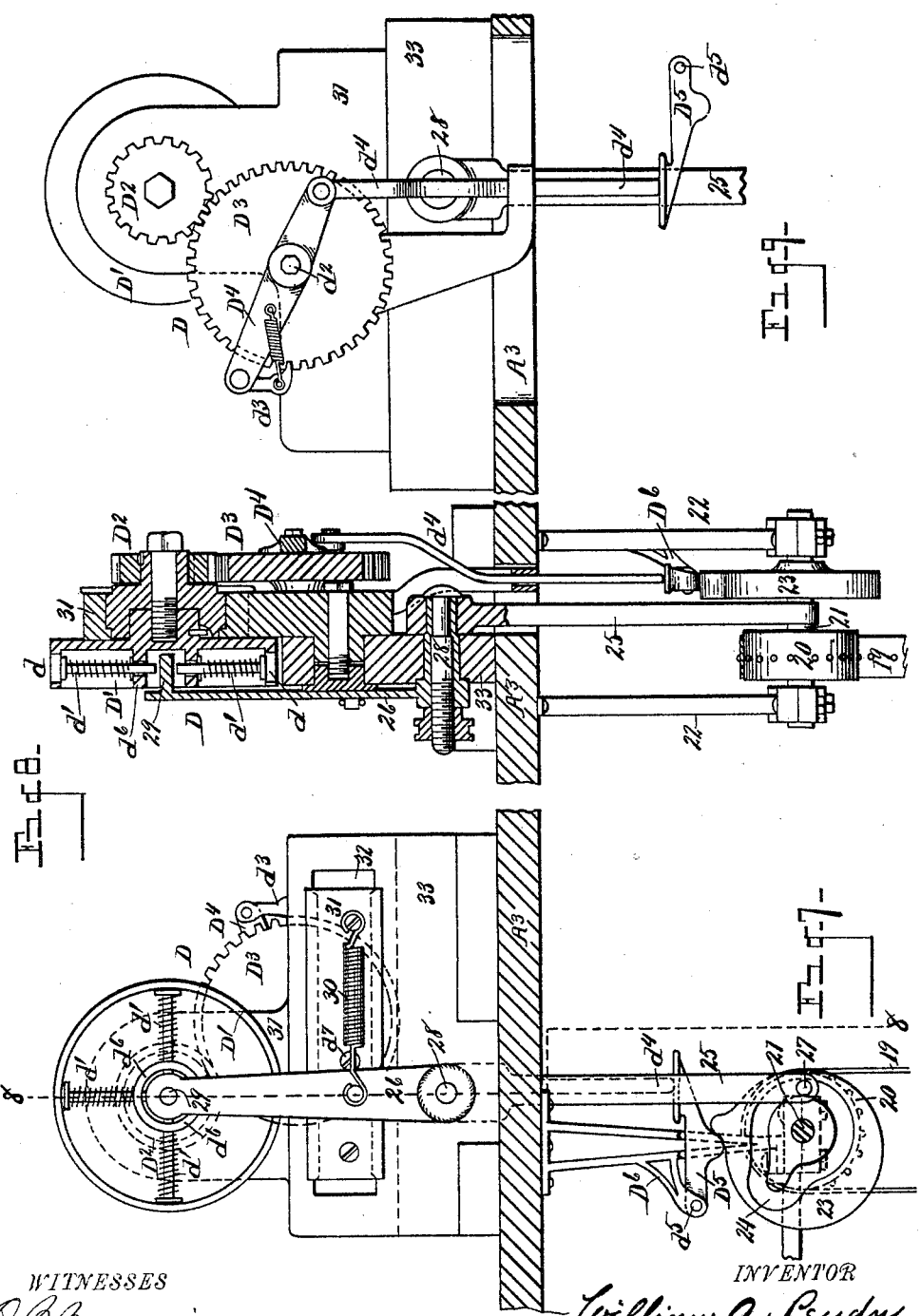

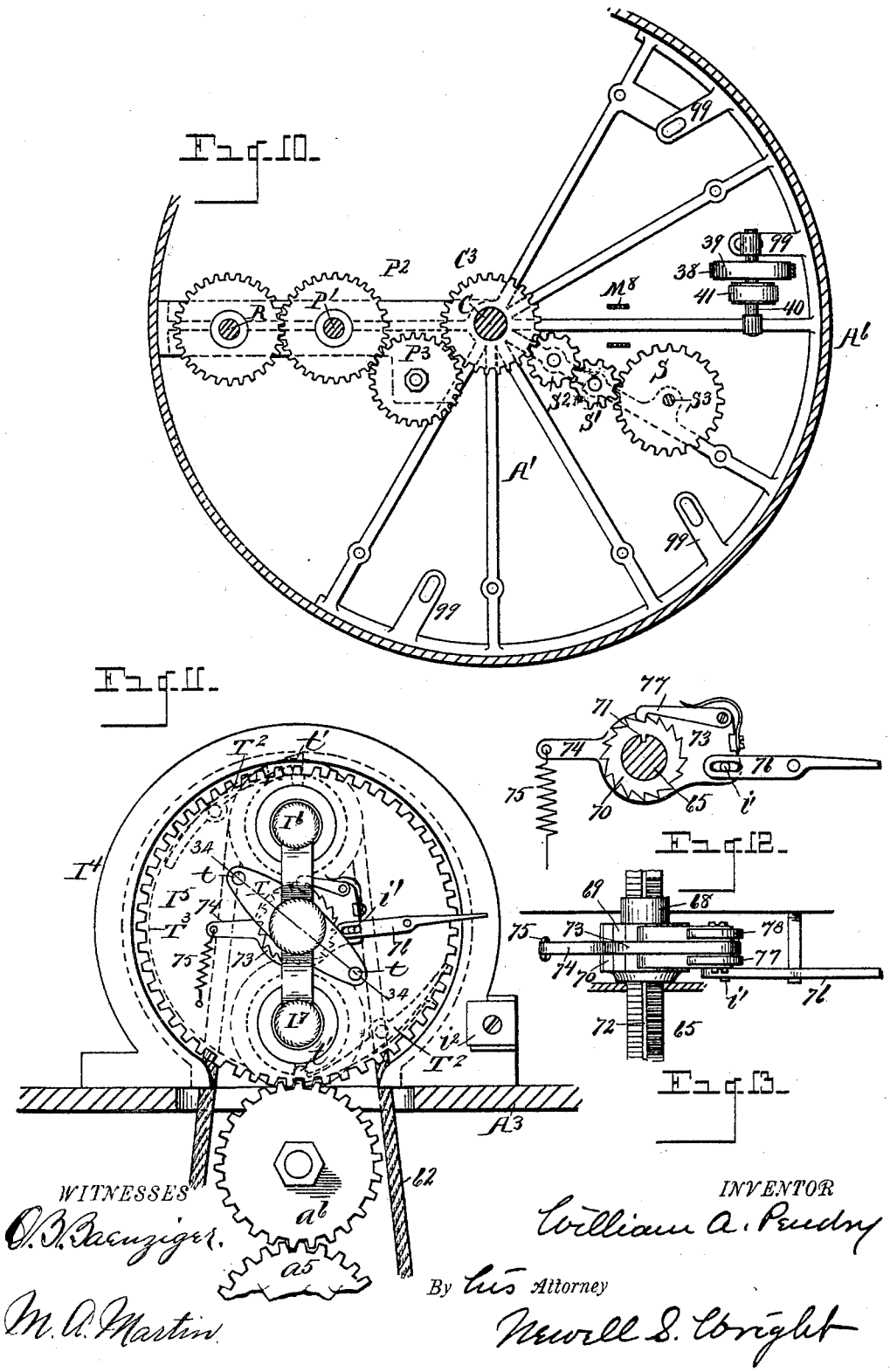

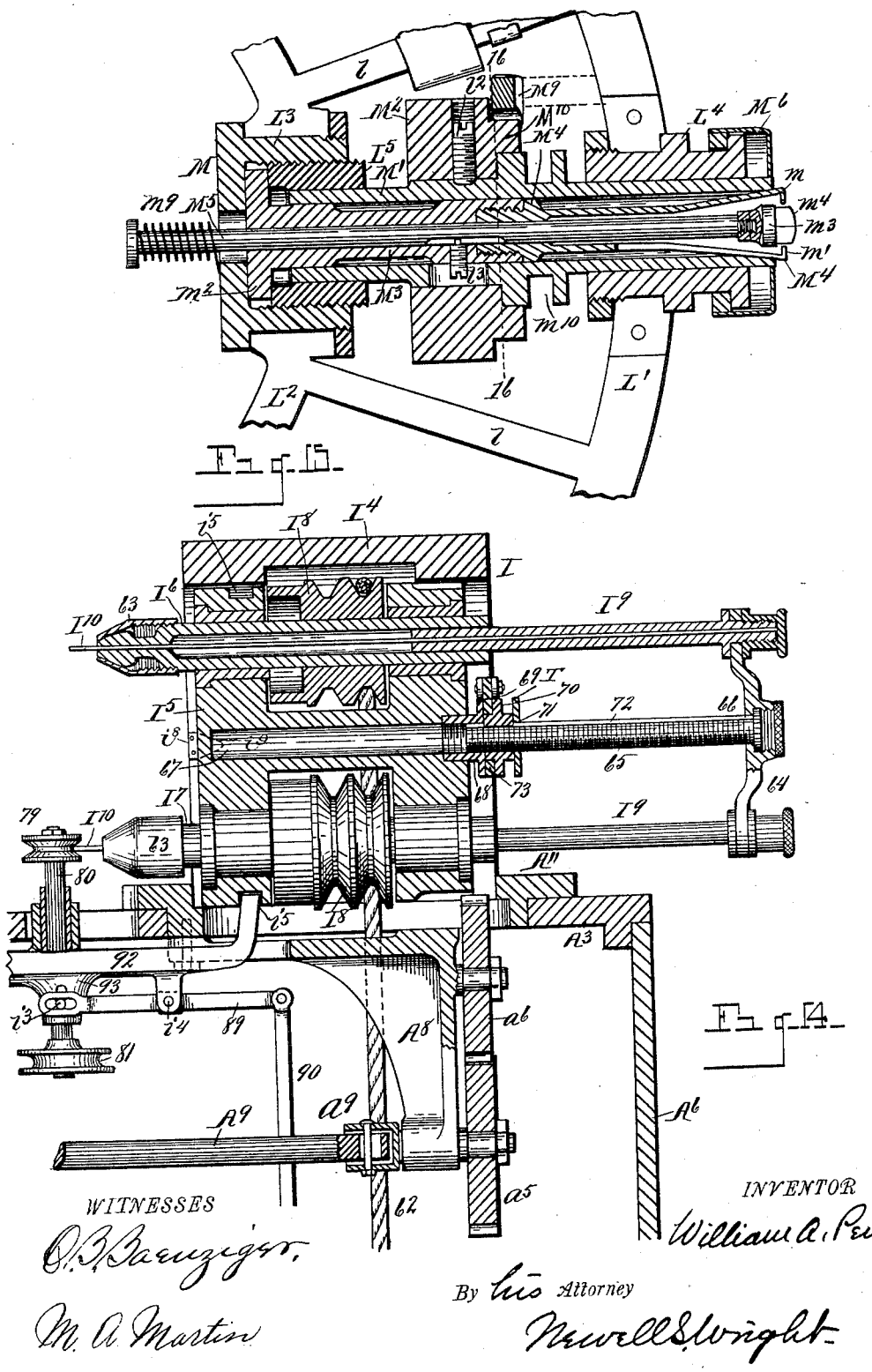

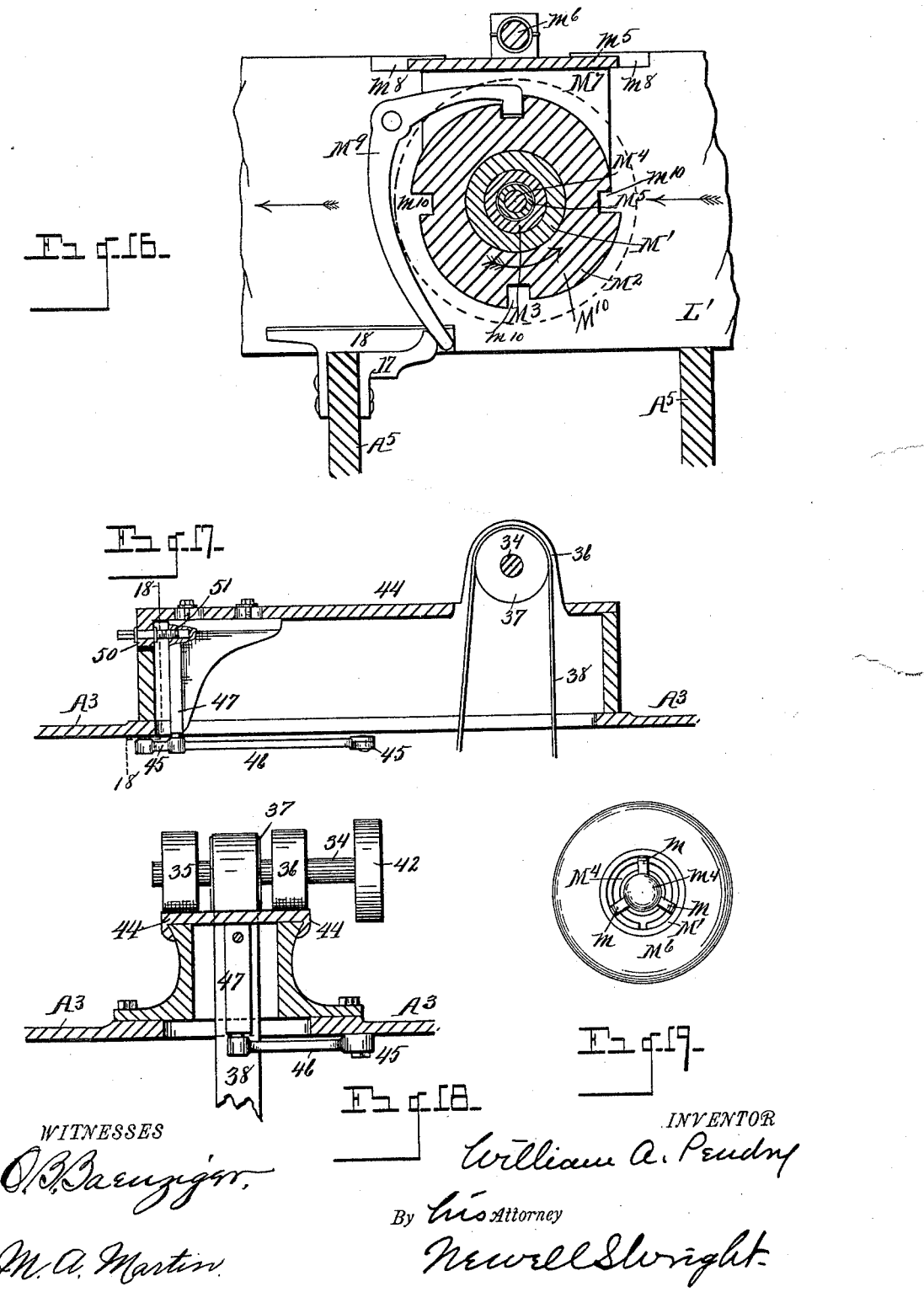

(No Model.)  12 Sheets—Sheet 9.
W. A. PENDRY.
BUTTON MAKING MACHINE.
No. 581,830.  Patented May 4, 1897.
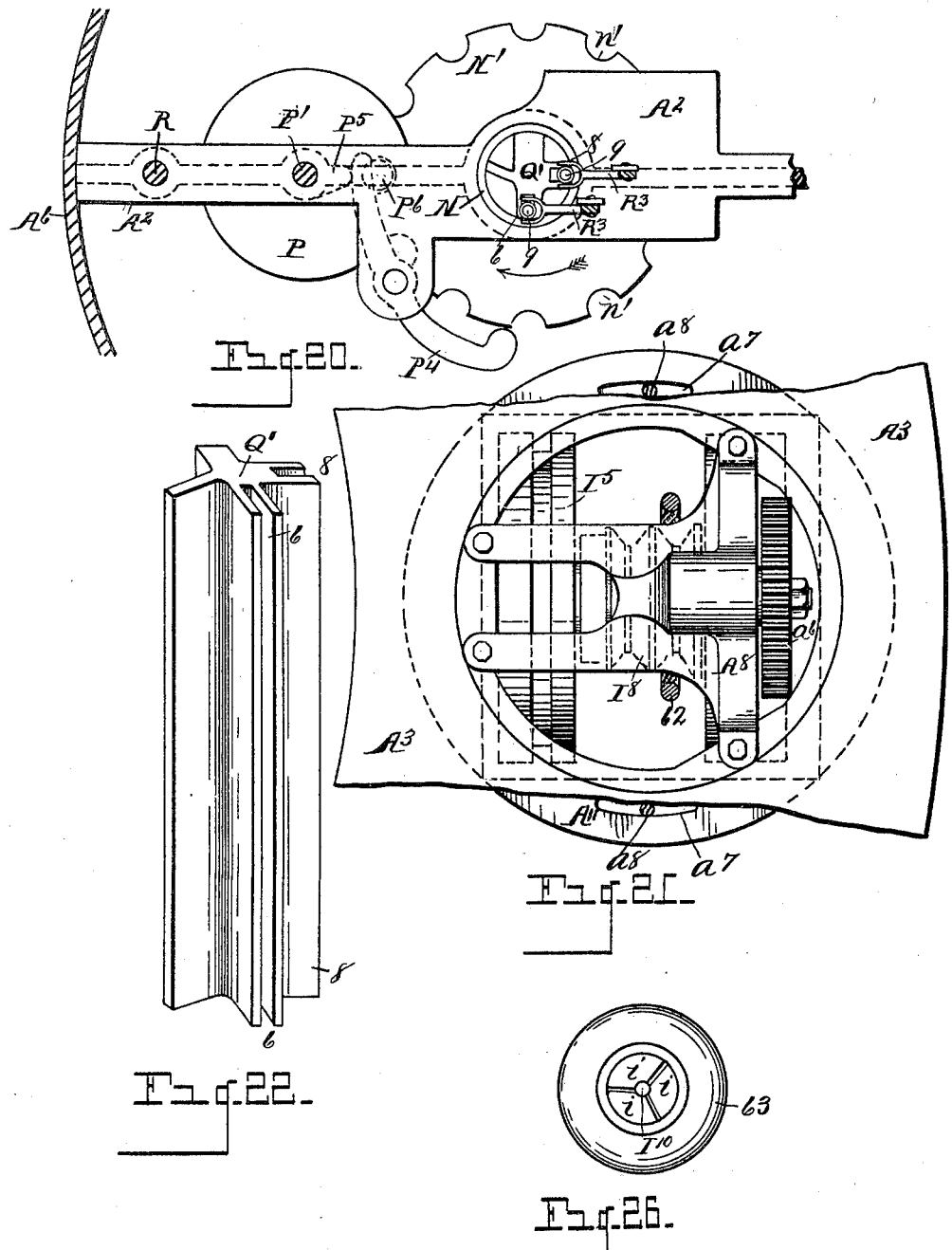
WITNESSES  INVENTOR
  William A. Pendry
  By his Attorney (No Model.) 12 Sheets—Sheet 10.
W. A. PENDRY.
BUTTON MAKING MACHINE.
No. 581,830. Patented May 4, 1897.
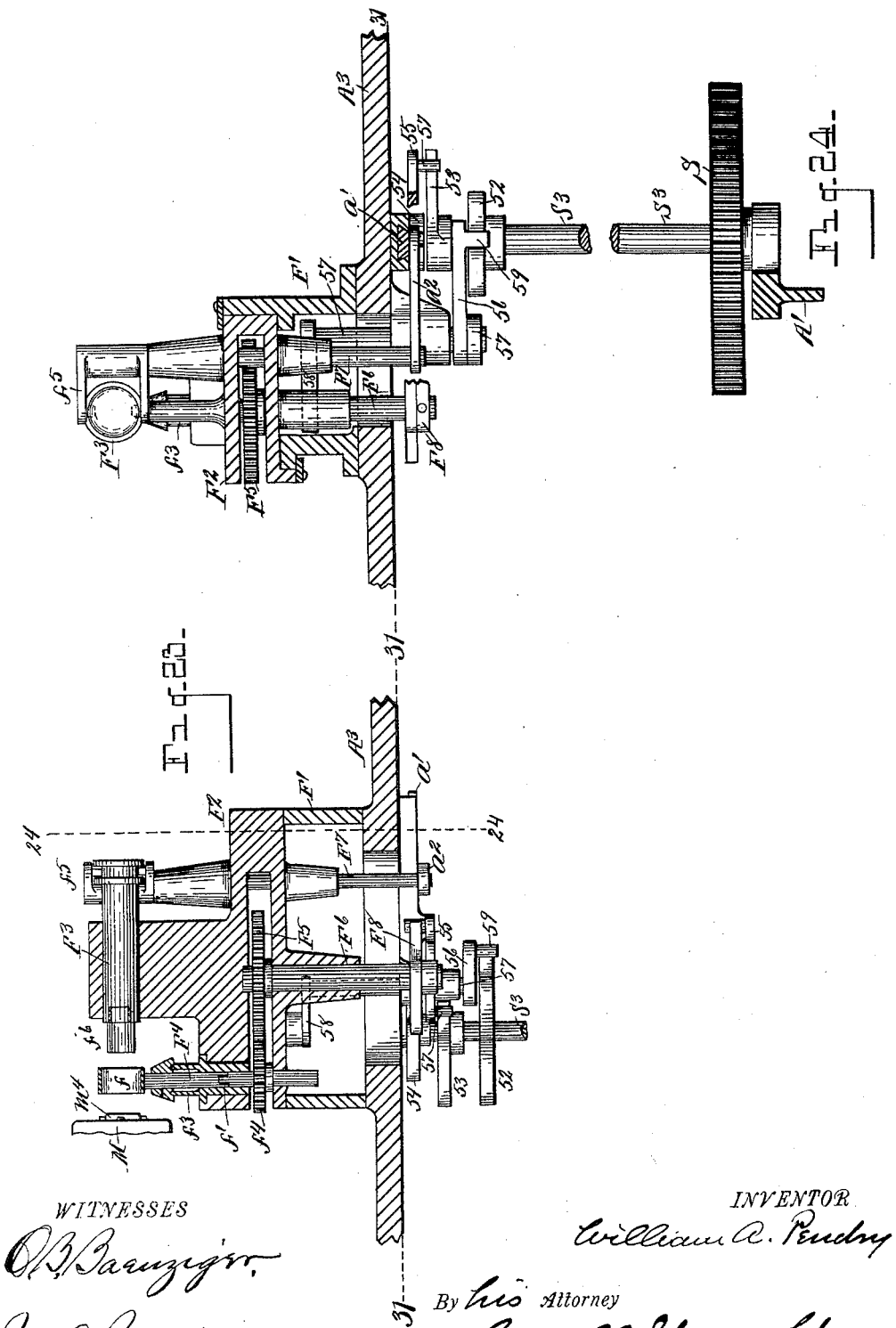
WITNESSES
INVENTOR
William A. Pendry
By his Attorney (No Model.)

W. A. PENDRY.
BUTTON MAKING MACHINE.

No. 581,830. 12 Sheets—Sheet 11.

Patented May 4, 1897.

WITNESSES

INVENTOR
William A. Pendry
By his Attorney (No Model.)   12 Sheets—Sheet 12.
W. A. PENDRY.
BUTTON MAKING MACHINE.
No. 581,830.   Patented May 4, 1897.
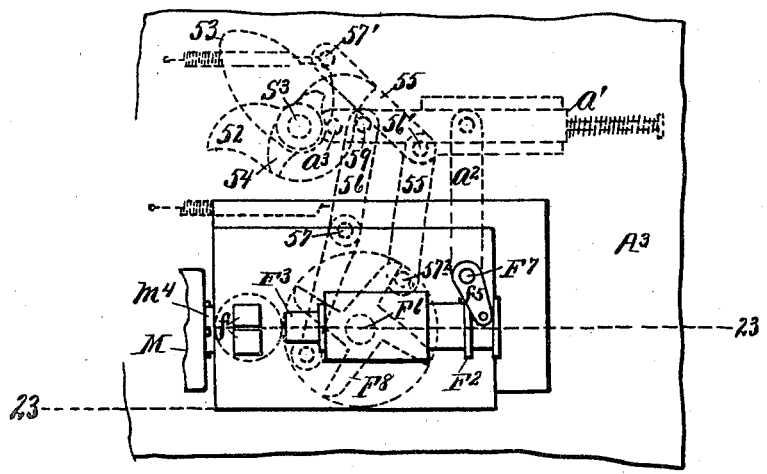
Fig. 25.
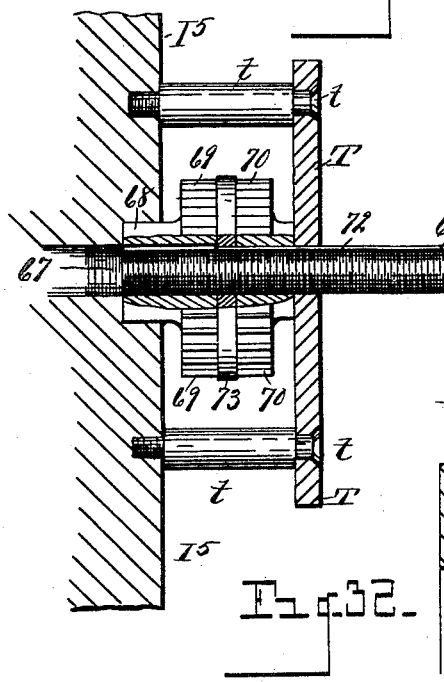
Fig. 32.
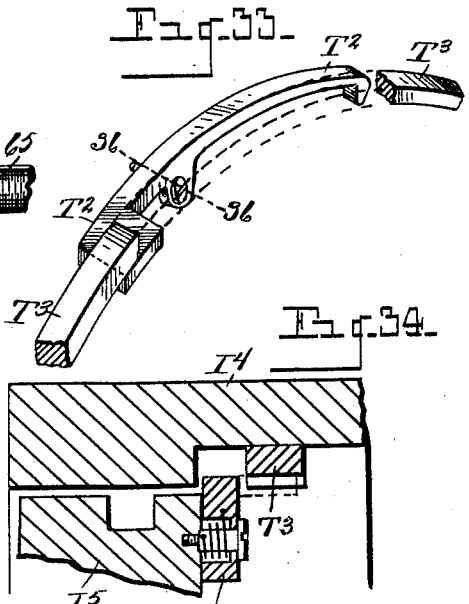
Fig. 33.
Fig. 34.
WITNESSES
O. B. Paenziger
John T. Miller
INVENTOR
William A. Pendry
By his Attorney
Newell S. Wright

UNITED STATES PATENT OFFICE.

WILLIAM A. PENDRY, OF DETROIT, MICHIGAN.

BUTTON-MAKING MACHINE.

SPECIFICATION forming part of Letters Patent No. 581,830, dated May 4, 1897.

Application filed February 8, 1896. Serial No. 578,552. (No model.)

*To all whom it may concern:*

Be it known that I, WILLIAM A. PENDRY, a citizen of the United States, residing at Detroit, county of Wayne, State of Michigan, have invented a certain new and useful Improvement in Button-Making Machines; and I declare the following to be a full, clear, and exact description of the invention, such as will enable others skilled in the art to which it appertains to make and use the same, reference being had to the accompanying drawings, which form a part of this specification.

My invention relates to an improved button-making machine, having for its object a machine for this purpose whereby the entire operation of making completed buttons from suitable blanks may be carried out by a single machine rapidly and economically, various operations necessary for the construction of the completed buttons being carried out by the machine in a succession of steps or stages from the feeding of the button-blanks thereto until the finished result is obtained.

My invention has more special reference to a machine for making pearl buttons, but I would have it understood that I do not confine its scope or application thereto alone, as it may be used for the construction of buttons from other materials.

My invention consists of the constructions, combinations, and arrangements of devices and appliances hereinafter specified and claimed, and illustrated in the accompanying drawings, in which—

Figure 28:
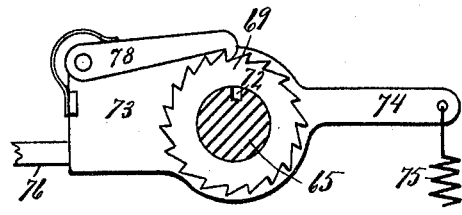
Figure 29:
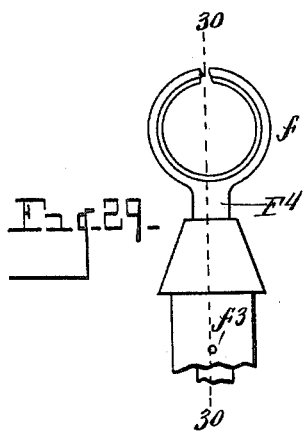
Figure 30:
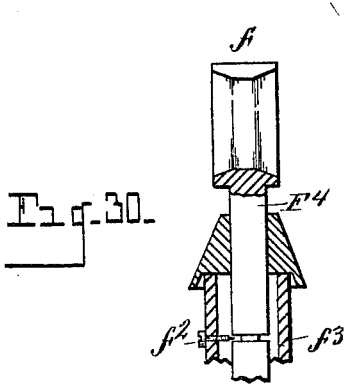
Figure 31:
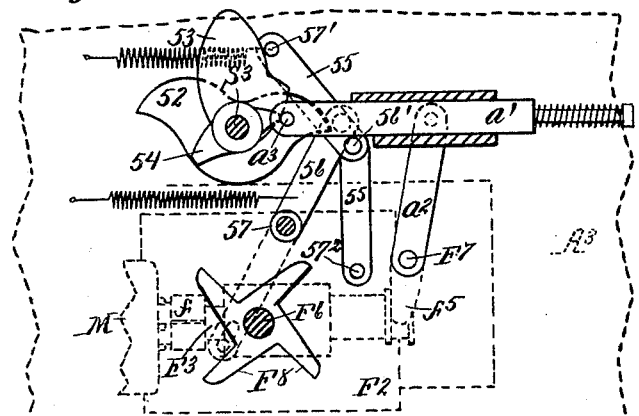

Figure 1 is a plan view showing my invention with the cover removed. Fig. 2 is a vertical section on the line 2 2, Fig. 1, showing parts in elevation. Fig. 3 is a horizontal section on the line 3 3, Fig. 2. Fig. 4 is a plan view with the revolving turret or table removed. Fig. 5 is a view in section on the line 5 5, Fig. 4. Fig. 6 is a view in section on the line 6 6, Fig. 2. Fig. 7 is a detail view of the feeding mechanism in side elevation with the table in section. Fig. 8 is a view in vertical section on the line 8 8, Fig. 7. Fig. 9 is a view in elevation of the mechanism shown in Fig. 7, viewed from the opposite side. Fig. 10 is a view in horizontal section on the line 10 10, Fig. 2. Fig. 11 is a view in rear elevation of one of the drills. Fig. 12 is a detail view, in side elevation, of the feeding mechanism of a set of drills. Fig. 13 is a view of the same in plan. Fig. 14 is a view of one of the set of drills in vertical section on the line 14 14, Fig. 1. Fig. 15 is a view of one of the chucks in horizontal section on the line 15 15, Fig. 2. Fig. 16 is a view in vertical section on the line 16 16, Fig. 15. Fig. 17 is a longitudinal vertical section on the line 17 17, Fig. 1. Fig. 18 is a vertical cross-section on the line 18 18, Fig. 17. Fig. 19 is a front view of one of the chucks. Fig. 20 is a horizontal section on the line 20 20, Fig. 2. Fig. 21 is an inverted plan view of one of the sets of drills. Fig. 22 is a separate view in perspective of the stationary guide Q'. Fig. 23 is a longitudinal vertical section of the button-reversing mechanism on the line 23 23, Fig. 25, showing parts in elevation. Fig. 24 is a vertical section of the button-reversing mechanism on the line 24 24, Fig. 23. Fig. 25 is a plan view of the button-reversing mechanism. Fig. 26 is a front view of one of the drill-spindles. Fig. 27 is a view of the ratchet-wheel 70 and related parts. Fig. 28 is a view of the ratchet-wheel 69 and related parts. Fig. 29 is a front elevation of the ring $f$. Fig. 30 is a horizontal section on the line 30 30, Fig. 29. Fig. 31 is a view corresponding to Fig. 25, but showing the parts in operative position, the table being removed. Fig. 32 is a detail view showing the manner of securing the hub 69 to the spool, on the line 34 34, Fig. 11. Fig. 33 is a detail view of a pawl $T^2$ and wiper $T^3$. Fig. 34 is a view in section on the line 36 36, Fig. 33.

I carry out my invention as follows:

The supporting-frame may be of any suitable construction. As shown in the drawings, it consists of a base A, a spider A', a support $A^2$, a stationary table $A^3$, and a stationary race or track $A^4$, having a connected spider $A^5$.

$A^6$ is a suitable inclosing case.

$A^7$ is a top or covering.

B is a main driving-shaft provided with a driving-pulley B'.

C denotes a shaft provided with a beveled gear C', meshing with a gear $B^2$ upon the shaft B.

$C^2$ is a non-rotatable collar located upon the shaft C, in which the driving-shaft B is journaled at one end, as indicated at $b$, the opposite end of the driving-shaft having its bearings upon the base A, as indicated at $a$.

The shaft C is journaled at its lower end in the base A and at its upper end in the spider A', and is provided at its upper end above said spider with a gear $C^3$.

Upon the stationary table $A^3$ are supported a feeding device D, a grinder E, a button-reversing device F, an additional grinder G, buffing devices H and H', a series of drilling devices I, an additional buffer J, and, if desired, a counter K. I have shown in the accompanying drawings two buffing devices H and H' between the grinder G and the adjacent drilling device and an additional buffing device J between the last of the series of drills and the feeding device; but I would have it understood that I do not limit myself to any definite number of buffing devices, as my invention contemplates any desired number as coming within its scope. So, also, I have shown in the drawings a series of five drilling devices, that number being provided to drill four outer holes and the center "well," but I would have it understood that I do not limit myself to any definite number of drills, since my improved machine is intended to be furnished with any required number to drill any desired number of holes in the buttons. The particular construction and operation of these feeding, reversing, and buffing devices, together with that of the grinders and drills, will be hereinafter described.

L denotes a rotatable turret or table carrying a series of chucks M. In Fig. 1 I have shown a series of twelve chucks; but I would have it understood that I do not limit myself to any particular number thereof, as my invention contemplates the employment of any desired number of chucks carried by the revolving turret or table. The construction and operation of the series of chucks will be subsequently explained. The turret is preferably constructed with an outer rim L' and an inner rim $L^2$, the outer rim being preferably of cylindrical form and the inner rim of angular form, as shown. In these rims the chucks are supported, the rims being connected by a suitable number of arms $l$. The rim L' travels in its rotation upon the race or track $A^4$ therebeneath.

N denotes a rotatable sleeve or hollow axle provided with a toothed disk N' at its lower end, the upper extremity of the sleeve being rigidly engaged with the turret in any suitable manner. In the drawings the sleeve N is shown constructed with a flange $n$ at its upper end, which may be secured in any suitable manner to a corresponding flange $l'$ upon the inner rim $L^2$ of the turret. The sleeve or axle N is actuated by means of a rotatable disk P upon a shaft P', geared with the gear $C^3$, as by intermediate gears $P^2$ $P^3$. The disk N' is arranged to be rotated one step by each complete revolution of the disk P in any suitable manner. The turret shown in the drawings is provided with twelve chucks M. The disk N' is arranged, therefore, to be rotated one-twelfth of a complete revolution upon each complete revolution of the disk P. The disk N' is accordingly provided upon its periphery with twelve recesses or notches $n'$, as shown in Figs. 6 and 20, engageable by a pawl $P^4$, actuated once upon each complete revolution of the disk P in any suitable manner, as by a cam $P^5$, to disengage the pawl from the disk N', while a spur or arm $P^6$ engages in one of said recesses or notches and carries the disk N' forward one-twelfth of a complete revolution. The pawl serves to hold the said disk from rotation during the intervals between the stop movements of the disk.

It will be understood that the chucks M are spaced one from another upon the turret a distance apart corresponding to the step movement of the turret, the various feeding, grinding, reversing, buffing, and drilling devices located upon the stationary table $A^3$ being spaced one from another in a similar manner, so that as the turret revolves the chucks will be moved by successive steps from one to another of said devices upon said table to present the button-blanks carried by the chucks to said devices in successive order until the button is completed.

The shaft B is provided with a pulley $B^3$ for driving the feeding mechanism. Meshing with the beveled gear C' is a series of gears for driving the grinding, buffing, and drilling mechanisms. Thus to drive the grinder E, I provide a gear E' upon a shaft $E^2$, meshing with the gear C'. $E^3$ is a pulley belted with a suitable part of said grinder, said pulley being located upon a shaft $E^4$, geared with the shaft $E^2$ by intermediate gears $e$ $e'$. The grinder G is similarly driven by a beveled gear G' upon a shaft $G^2$, geared to a shaft $G^3$, as by gears $g$ $g'$, the shaft $G^3$ being provided with a pulley $G^4$. Similar driving mechanism is provided to drive the buffers H and H'. As indicated in the drawings, $H^2$ and $H^3$ are shafts provided with gears $H^4$ and $H^5$, respectively, meshing with the gear C' and with shafts $H^6$ and $H^7$, as by intermediate gears $h$ $h'$, said shafts each being provided with a pulley $H^8$.

To drive the several drills, the gears I' are provided, located upon shafts $I^2$, respectively, and meshing with the gear C', said shafts being provided with driving-pulleys $I^3$, respectively belted with corresponding parts of the drilling mechanism. The buffer J is driven by a similar mechanism, (indicated in general at J',) the driving mechanism being the duplicate of that already explained for driving the buffers H and H' and the grinder G. The shafts $E^2$, $G^2$, $H^2$, $H^3$, and J' are further provided with pulleys indicated by the numerals 1 2 3 4 5 for driving the chucks M, as hereinafter explained. Within the hollow axle N is a stationary cylindrical casting Q, provided with flanges $q$ $q'$ at its upper end above the flange $n$ of the axle N, the flange $q$ resting upon the flange $n$. Within the cylindrical casting Q is located a vertical guide Q', having guide-arms (indicated by the numerals 6 and 8) vertically recessed, as shown, in each of which arms is located a corresponding vertically-movable slide 9, provided with beveled-faced shoulders 10 and 11. These slides are actuated from a rotatable shaft R, geared to the shaft P', as by intermediate gears $r$ and $p$. The shafts P' and R are journaled in the spider A' and support A², as shown. Upon the shaft R are engaged eccentrics R', connected by rods R² to bell-cranks R³, connected with the slides 9, respectively, and by which said slides are reciprocated. One of the rods R² is shown broken off in Fig. 2.

I will next describe the construction of one of the chucks M. (Shown in detail in Fig. 15.)

All the chucks of the series are preferably of similar construction. These chucks are located upon the rims L' L² of the turret, said rims being provided with bearings L³ and L⁴ for each of the chucks. L⁵ is a bushing in the bearing L³, preferably having a threaded engagement therewith, as shown. M' denotes a hollow shaft having a reciprocatory and rotatable engagement in said bearings and provided with a pulley M², preferably secured to said shaft by a screw $l^2$. Within said shaft is a sleeve M³, with one end of which is engaged a clamping device M⁴, which may be made tubular at the inner end and having a screw-threaded engagement with the sleeve M³, as shown. The outer extremity of the clamping device is divided into a series of clamping-jaws $m$, as indicated more fully in Fig. 19. Said jaws are made normally flaring and constructed with inwardly-turned fingers $m'$ at their extremities to grasp the periphery of a button-blank. The sleeve M³ and the clamping device M⁴ are non-reciprocatory, one end of the sleeve being provided with a flange $m^2$, over which the bushing L⁵ is engaged to hold it longitudinally immovable. Within the sleeve M³ is a spindle M⁵, provided at one end with a head $m^3$, preferably removable, as shown, so as to be interchangeable for different sizes of buttons. This head is sufficiently large to form a support for the back of the button, so that the drills, in passing through the button-blank, will not chip away or break out the back, as the chipping or breaking away of the back damages the button and reduces its value. The button-blank (indicated at $m^4$) is held against said head by the jaws $m$. The spindle M⁵ has a reciprocatory movement within the sleeve M³ and the clamping device M⁴, and is also made to rotate with the sleeve.

In Fig. 15 a screw $l^3$ is shown engaging the sleeve and the spindle to cause their simultaneous rotation. The shaft M' is made to reciprocate by any suitable device. As it is moved toward the head of the spindle M⁵ it causes the jaws $m$ to be pressed against the periphery of the button-blank to hold the blank firmly in place. The opposite movement of the shaft will remove the pressure upon said jaws. The forward reciprocation of the spindle M⁵ will force the button-blank out of engagement with the jaws.

M⁶ is a cap engaged upon the outer end of the shaft M' and the bearing L⁴.

The shaft M' is shown in the drawings to be reciprocated in the following manner: M⁷ denotes a yoke engaging the shaft M', said yoke being carried by a slide $m^5$, with which is engaged a spindle $m^6$, upon which is mounted a coiled spring $m^7$. The rear end of the spindle $m^6$ projects inward adjacent to the beveled-faced shoulder 11 of the slide 9, whereby said spindle is moved forward when the slide 9 is moved downward, carrying with it the slide $m^5$, the yoke M⁷, and the shaft M'. The rims L' L² may be provided with any suitable guides for said slide $m^5$, as indicated at $m^8$, Fig. 16. The spindle M⁵ may also be reciprocated in any desired manner. As shown, the flange $q$ of the cylindrical casting Q is provided with reciprocating shafts $q^2$, arranged to bear upon the inner ends of the spindles M⁵, when they arrive in the proper position, as the turret is rotated step by step. The inner ends of said shaft $q^2$ extend adjacent to the shoulders 10 of the slide 9, whereby said shafts are actuated upon a proper movement of the slide 9, thereby forcing outward the corresponding spindle M⁵, which is provided with a retracting-spring $m^9$. Spring $m^7$ allows the slide $m^5$ to yield in case undue pressure is brought to bear upon the shaft M' and consequently upon the button-blank. The spindles $m^6$, it will be observed, are moved forward to cause the jaws $m$ to grip the button on the descent of the slide 9, while the spindle M⁵ is moved forward to release the button on the upward movement of the slide 9.

The pulleys M² may be rotated in any desired manner within the scope of my invention. As shown, they may be rotated by frictional contact with belts M⁸, said belts being engaged, respectively, with the pulleys 1 2 3 4 5 on shafts E², G², H², H³, and J' and over pulleys 12 13 14 15 16 upon corresponding journals attached to the track A⁴. It will be evident, however, that when the button-blanks are being drilled the chucks will need to be stationary. This may be done in any desired manner. As shown, it is accomplished by means of pawls M⁹, fulcrumed upon the rim L' and engaging with notches $m^{10}$ in the periphery or numbering-plate M¹⁰ of the corresponding pulley M². The opposite end of the said pawl extends downward in the path of a trip 17 as the turret is rotated, the trip serving to lift the pawl out of engagement with the corresponding pulley M², permitting its rotation to another notch. This rotation may be accomplished by a wiper 18, upon the upper edge of which the periphery of the pulley M² travels and by which said pulley M² is rotated as the turret revolves step by step. The trips and wipers 17 and 18 are located toward the base of the rim L' and may be secured in place in any suitable manner. In Fig. 16 they are shown bolted to one of the arms of the spider A⁵.

In Fig. 4 the trips 17 are shown elongated opposite the pulleys 12 and 13 sufficient to hold the pawl out of engagement with the pulley M² while a chuck is opposite the buffer mechanism J and the grinder E. The trip is further elongated, as shown in Fig. 4, adjacent to the pulleys 14 15 16 sufficiently to hold said pawl out of engagement with the corresponding pulley M² while a chuck is opposite the grinder G and the buffers H H'. Adjacent to the drilling devices the trips 17 are made shorter, so that the pulley M² will be held from rotation while opposite the respective drills. A shortened form of the trip is shown in Fig. 4.

I will next proceed to describe the construction of the feeding device D. (Shown in detail more particularly in Figs. 7, 8, and 9.) The device here shown consists in a rotatable feed-wheel D', constructed with a series of orifices $d$ on its periphery, into which orifices the button-blanks are placed by an attendant. This disk is rotated by a gear D², meshing with a gear D³, supported upon a sliding bracket 31. Within the wheel D' are located a series of spring-actuated spindles $d'$, corresponding to the number of orifices $d$, the outer extremities of said spindles being adjacent to said orifices. Fulcrumed on the shaft $d²$ of the gear D³ is a vibratory lever D⁴, provided with a spring-actuated pawl $d³$ at one extremity thereof, engaging the toothed periphery of the gear D³. With the opposite end of the lever D⁴ is connected a reciprocatory rod $d⁴$, which upon being raised will obviously cause the pawl $d³$ to rotate the gear D³ one step, thereby actuating the gear D² and the disk D' in a corresponding manner one step, the distance traveled by successive steps of the disk D' being sufficient to carry the orifices $d$ one by one in succession around in front of the adjacent chuck M and in position to deliver a button-blank to the jaws of the chuck.

As already described, the main driving-shaft B is provided with a pulley B³ for driving the feeding mechanism, a sprocket-belt 19 leading therefrom to a sprocket-wheel 20 upon a shaft 21, having its bearings in hangers 22. Upon said shaft 21 is engaged a double cam 23, having a cam-shaped periphery and also a cam-groove 24. A vibratory arm 25 is provided at its lower end with a pin 27, engaged in the cam-groove 24, the rotation of the cam serving to vibrate said arm. The upper and lower portions 25 and 26 of said arm are fulcrumed intermediate their extremities, as shown at 28. The upper end of the portion 26 of said arm is constructed with a finger or flange 29, projecting into the center of the wheel D' between the inner ends of the spindles $d'$.

A retracting-spring 30 connects the arm 25 26 to a sliding carriage 31, said carriage carrying the feed-wheel D' and gears D² D³ and being arranged to slide in an opening 32 in a stationary bracket 33 on the table A³. When the arm 25 26 is actuated, it will first pull on the spring 30, thereby advancing the carriage 31 and the feed-wheel to the chuck. When the feed-wheel meets the chuck, its farther advancement is checked, but the further movement of the arm 25 26 carries the flange 29 to strike against the adjacent end of the spindle $d'$ in its path to force said spindle outward and thereby push the button-blank in the corresponding orifice $d$ into the jaws of the adjacent chuck. On the opposite movement of the arm 25 26 it strikes against a stud $d⁷$ to force backward the carriage 31. An upward movement in given to the rod $d⁴$ by bringing its lower extremity down to engage a rocking step D⁵, fulcrumed, as at $d⁵$, upon a bracket D⁶, said step riding upon the periphery of the cam 23.

I will next describe the construction of one of the buffing devices H, H', and J. (Shown in detail in Figs. 17 and 18.) These buffing devices and the grinders E and G may all be constructed essentially alike. The single description of the device shown in Figs. 17 and 18 will answer as a description for them all. Accordingly, 34 denotes a shaft supported in the bearings 35 and 36, the shaft being provided with a pulley 37, belted, as by a belt 38, with a corresponding pulley 39, the shaft of which is belted, as by a belt 41, with the corresponding pulleys H⁸, E³, G⁴, or J², geared with the shaft J', as the case may be. Upon one end of the shaft 34 is a buffing-wheel 42. A suitable grinder 43 takes the place of the buffing-wheel in the grinding devices E and G. This grinder is preferably made of emery or analogous grinding or abrading material. In order to move the buffing-wheels or grinders inward against the base of the button-blanks, in order that the buffing-wheel and grinders may operate upon said blanks, the bearings 35 and 36 are mounted upon a slide 44, with which is connected a bell-crank 45, which may be fulcrumed to the table A³, one arm, as the arm 46, being connected with the corresponding slide, as by an upright bracket 47, and the other arm is connected with a proper source of power to operate said crank, as shown in Fig. 4. The arms 48 of said bell-cranks are all connected together, as by rods 49, so as to be simultaneously actuated. The means of actuating said bell-cranks will be described hereinafter. The bracket 47 is bolted to the horizontal portion of the slide 44 and adjustably connected also with a vertical flange 50 of said slide, as by a bolt 51, having a threaded engagement with said bracket for adjusting the operation of the slide.

The feeding, buffing, and grinding mechanisms of the machine being now described, I will next explain the construction of the button-reversing mechanism F, as herewith shown more particularly in detail in Figs. 23, 24, and 25, in which F' indicates a housing located upon the table A³ and supporting a sliding bed F², in which is mounted a horizontally-reciprocatory spindle F³ and an upright partially-rotatable spindle F⁴, carrying at its upper end a ring $f$ to receive the button-blank from the corresponding chuck. The orifice through said ring, it will be perceived, is in the line of reciprocation of the spindle F³. The upper end of the spindle F⁴, carrying the ring $f$, is preferably made detachable, as indicated at $f'$, to permit the interchanging of said ring for different sizes of button-blanks. A set-screw $f²$ (shown in Fig. 30) serves to hold the said spindle in place within a bushing $f³$. Upon the lower end of the spindle F⁴ is a gear $f⁴$, meshing with a gear F⁵ upon a shaft F⁶. F⁷ is a shaft carrying at its upper end a crank-arm $f⁵$, engaging one extremity of the spindle F³ to reciprocate said spindle. The purpose of this reversing mechanism is to take a button-blank $m⁴$ from an adjacent chuck M, the blank being received into the ring $f$, the end of the spindle F³ being advanced partially into said ring sufficiently to form a backing for the blank as it is so received into the ring, then to turn the ring about one-half of a revolution, and then to force the blank back into the chuck by another advancement of the spindle F³, said spindle retracting, after its first advancement, partially into the ring in order to permit the turning of the ring to present the opposite face of the blank to the chuck. The slide F² is to be advanced to the chuck, the ring $f$ advancing over the periphery of the blank as the clamping-jaws $m⁶$ are released therefrom. It will be observed by reference to Fig. 15 that the button-blank projects outward from the jaws sufficiently to permit the ring $f$ to advance partially over its periphery. The first advancement of the spindle F³ partially into the ring is necessary to hold the blank in proper upright position. The movements of the parts now described to accomplish this reversing of the blank are accomplished as follows:

In Figs. 10 and 24, S denotes a gear journaled upon the spider A', geared with the gear C³ upon the shaft C by intermediate gears S' and S². The gear S is mounted upon a shaft S³, upon which is engaged a cam 52, a cam 53, and a cam 54. F⁸ is a star-shaped gear upon the lower end of the shaft F⁶. A slide $a'$ is engaged with the under face of the table A³, which slide is connected by an arm $a²$ with the shaft F⁷. One extremity of this slide is provided with a spur $a³$, riding upon the periphery of the cam 54, whereby reciprocatory movement is given to the spindle F³.

55 is a bell-crank lever fulcrumed to the table A³, as at 56', having at one end thereof a spur 57', riding on the periphery of the cam 53 and at the opposite end with a spur 57². An arm 56 is engaged with a shaft 57, leading up to an arm 58, connected with a slide F², the arm 56 being provided with a spur 59, contacting with the periphery of the cam 52. The spurs in the ends of the levers may be kept in contact with their respective cams in any suitable manner, as by springs 52. (Shown in Fig. 31.) It will be seen that as the shaft S³ is rotated the cam 52, actuating the arm 56, will move the slide F² accordingly, the slide carrying with it the shaft F⁶ of the star-shaped gear F⁸. The backward movement of the shaft F⁶ will cause the star-shaped gear F⁸ to contact with the spur 57² on the bell-crank 55, whereby said gear will be partially rotated, rotating the gear F⁵ in a corresponding manner, but not sufficiently to cause the proper rotation of the shaft F⁴ for reversing the button-blank. The movement of the cam 53, however, operating upon the bell-crank 55, will give it a throw to further rotate the star-shaped gear and thereby give a further rotation to the shaft F⁶ to complete the proper movement of the gear F⁵, which should have a quarter-revolution, giving a half revolution to the gear $f⁴$, thereby reversing the button-blank. The cam 54 is provided with a short and with a long tooth, as indicated. The riding of the spur $a³$ over the short tooth will force the spindle F³ partially into the ring $f$ to form a backing for the button-blank when the ring $f$ is advanced to the chuck. The spindle F³ is then retracted, while said ring is reversed, but is again advanced a still farther distance as a spur $a³$ rides over the longer tooth to force the blank into the chuck again.

I will now proceed to explain the construction of one of the series of drills I, the series of drills being all of the same construction, so that a description of one of them answers for all, as shown more particularly in Figs. 2, 11 to 14, 21, 26, 27, and 28.

A⁸ denotes a bracket engaged on the under face of a housing I⁴, in which is journaled a driving-shaft A⁹, provided with a gear $a⁴$, meshing with a gear A¹⁰, as upon the axle N, by which the said shaft is driven, said shaft being journaled toward the bevel-gear $a⁴$ in a bracket 60, a series of said brackets being united to a plate 61. At the opposite end the shaft A⁹ is provided with a gear $a⁵$. Within the housing I⁴ is located a rotatable spool I⁵, toothed at one end to mesh with a gear $a⁶$, as shown. In this spool are journaled tubular spindles I⁶ and I⁷, each provided with a driving-pulley I⁸. Within each of said spindles is a sleeve I⁹, carrying a drill I¹⁰. The spindles I⁶ I⁷ are rotated by means of a belt 62, passed over the pulley I⁸. The inner ends of said spindles are formed with jaws $i$, as shown in Fig. 26, and 63 denotes a cap having a screw-threaded engagement upon each of said spindles to clamp said jaws upon the drill I¹⁰. The opposite extremities of the sleeves I⁹ are connected by a cross-arm 64, said sleeves being arranged to be advanced simultaneously into the corresponding tubular spindles. 65 is a threaded spindle engaged with said cross-arm intermediate the ends thereof, as shown at 66. The spool I⁵ is constructed with a central orifice, (indicated at 67,) into one end of which is engaged an interiorly-threaded hub 68, provided with a ratchet-disk 69.

70 denotes an additional ratchet keyed, as indicated at 71, into a keyway 72 on the spindle 65.

Between the ratchets 69 and 70 is located a plate 73, provided with an arm 74, a spring 75 connecting said arm with the spool $I^5$. The plate at its opposite end is provided with a spur $i'$, engaged with a lever-arm 76, fulcrumed intermediate its ends to the spool $I^5$. Upon the housing $I^4$ is a trip $i^2$, so located that at each revolution of the spool said lever-arm 76 will strike the trip, thereby tilting the plate 73. 77 and 78 are pawls supported upon said plate and engaging said ratchets. It will be perceived that whenever the plate 75 is thrown downward by the movement of the lever-arm 76, as above specified, the pawls will exert a pull upon their respective ratchet-wheels. In order to give a suitable speed in the travel of the drills $I^{10}$, one of said ratchet-wheels, as the ratchet 69, is constructed with more teeth than the ratchet 70, as will be seen by comparing Figs. 27 and 28. It is obvious that if the ratchets 69 and 70 had an equal number of teeth the spindle 65 would not be advanced; but by making the ratchet 69 with more teeth, as above explained, said spindle will be correspondingly advanced slowly, but not too fast, to the work, as would be the case were the two ratchets not constructed and operating as above set forth.

The hub 69 is secured to the spool $I^5$ by means of a yoke T, (shown in Figs. 11 and 34 particularly,) screws $t\ t$ connecting the yoke to the spool.

The drill-rods $I^{10}$ are not clamped so tightly by the caps 63 as to prevent the longitudinal movement of the drill-rods, said cap being designed to close the orifice within the jaws through which the needle-rods project, so that there may be a close fit of the jaws upon varying sizes of drill-rods, or rods of varying gages.

It will be understood that the sleeves $I^6$ are not longitudinally movable.

The hub 68 is interiorly threaded to receive the spindle 65. If said hub were rotated by the ratchet-wheel 69, having the same number of teeth as the ratchet-wheel 70, there could not be any motion of the spindle longitudinally, but if the number of teeth on the ratchet 69 differs from the number of teeth on the ratchet 70 the rotation of the hub will be less than the rotation of the spindle 65. Hence the longitudinal movement of the spindle would correspond to the difference of rotation of the hub 68 and ratchet 70.

Two spindles $I^6\ I^7$, with their sleeves $I^9$ and drills $I^{10}$, are employed, so that the one drill may be sharpened while the other is at work. To this end the spool $I^5$ is made rotatable by means of the gear $a^6$ bringing each drill alternately into position to do its work while the other drill is being sharpened. A suitable grinding-wheel is shown at 79 for sharpening the drills, one of said wheels being adjacent to each drilling device I, each wheel being mounted upon a shaft 80, provided with a driving-pulley 81. The driving-pulleys 81 of the several sets of drills I may all be operated by a single belt 82, (shown in Fig. 4 more particularly,) running over said pulleys 81 and over additional pulleys 83, secured upon the table $A^3$, thence over a pulley 85 and downward under a pulley 86, thence up over a pulley 87 and under a pulley 88, thence up over a pulley 84 and over the pulleys 83, or vice versa, as may be desired, to give the right direction of movement to the grinding-wheels.

In order that the grinding-wheels may do their work properly, it will be desirable to give them a vertical agitation, which I accomplish by means of a lever 89, engaged to a spur $i^3$ upon the shaft 80, said lever fulcrumed intermediate its ends, as at $i^4$, the lever being connected by a rod 90 to an eccentric 91 upon a corresponding shaft $I^2$. It will be apparent that since a step-by-step movement is given to the turret by its driving mechanism, as hereinbefore described, a similar step-by-step movement will be given to the gear $A^{10}$ and consequently to the gears which rotate the spools $I^5$ of the several drilling devices.

In the particular machine shown in the drawings it will be remembered twelve chucks are provided, the disk N' being correspondingly constructed with twelve peripheral recesses $n'$, said disk being locked at each step by the pawl $P^4$. In a corresponding manner the gear $A^{10}$ is constructed with twelve times the number of teeth on the gear $a^4$, so that one-twelfth of a complete rotation of the gear $A^{10}$ or one step movement thereof will give to the gear $a^4$ a complete revolution. The gear $a^5$ should be constructed with one-half the number of teeth that are upon the spool $I^5$, thereby causing the spool to make one-half of a complete revolution at each step of the turret, thus exactly reversing the position of the two drills $I^{10}$ at each step movement of the turret to bring said drills alternately to the corresponding grinding-wheel 79. To bring the several spools with their drilling mechanisms up to the work, said spools have a longitudinal movement upon the table $A^3$. To effect this movement of the drills, the spools $I^5$ are each constructed with a circumferential groove $i^5$, in which is engaged one extremity of a slide 92, connected with the bearing 93 of the shaft of the corresponding grinding-wheel. At its opposite end said slide is engaged with a bell-crank lever 94, the bell-cranks being connected by rods 95. One of the bell-cranks 94 is constructed with an arm 96, riding upon a cam or eccentric 97 upon a shaft 98, by which proper movement is given to the slides 92 to reciprocate the corresponding spools $I^5$ to bring the drills to and from the work. It will thus be perceived that not only the turret but all the mechanisms thereupon and thereabout are governed in their step-by-step movements by the locking-pawl P⁴, engageable with the disk N'.

The various shafts 40, upon which are engaged the pulleys for the belts 38 and 41, have their bearings upon arms 99 and the adjacent arms of the spider A', it being understood that there is a set of said pulleys for each of the grinders E G and each of the buffing devices H, H', and J similar to those shown in Figs. 2 and 10.

To release the completed button from its chuck after it has passed the buffing device J, one of the shafts $q^2$ is constructed with a lateral arm $q^3$, (indicated in dotted lines in Fig. 1,) upon which the spindle M⁵ of the chuck rides before it reaches its primary position before the feeder D, thereby opening the jaws of the chuck, as hereinbefore described, the jaws being held open until the next button-blank is received thereinto in the manner hereinbefore specified.

The feeder D, the grinding devices, one or more, and the buffing devices, one or more, are the operative devices, together with the reversing device F, to work upon a button-blank, the chucks M serving to carry the blanks to said operative devices in proper succession. Should it not be desired to finish both faces of the button, the reversing device might be omitted.

The operation of the machine will now be understood. The attendant puts the button-blanks into the feeding device D, from which the blanks are passed into the adjacent chuck M. As the turret revolves that given chuck carries its button-blank upon the first step movement of the turret to the grinder E, by which one face of the blank is ground. The next step movement of the turret carries said chuck to the reversing mechanism whereby the blank is reversed. The next step movement of the turret carries the chuck to the grinder G, by which the opposite face of the blank is ground. Then by successive steps of the turret the chuck carries the blank to the buffers H and H', then step by step to the several drills I, thence past the counter K, which may be of any desired construction not specifically described herewith, thence to the final buffer J, passing which the said chuck discharges the completed button into a chute 100. That individual chuck is then ready to receive another button-blank. Meanwhile, of course, in the progress of the chuck with the turret, as already described, other succeeding chucks are following the same course in succession, all carrying their respective button-blanks to the grinding, reversing, buffing, and drilling devices, as described, the button-blanks passing only once through the hands of the attendant whose only duty is to feed the blanks to the feeding device D. Obviously the buttons may be completed in this manner rapidly and economically.

The reciprocatory spindle and plunger F³ is provided with a removable head $f^6$, so that the head may be interchanged to correspond with the changing of the ring $f$. The ring $f$ is preferably split, as shown more particularly in Fig. 29, so as to exert a spring tension upon the periphery of a button-blank to hold the blank securely therewithin. The ring is also preferably constructed with beveled front and rear edges, as indicated in Fig. 30, so that the rings may the more conveniently and surely engage the periphery of the button-blank.

The housing I⁴ of each of the series of drills I is preferably made adjustable on the table A³. To this end the housings are each mounted upon a base-plate A¹¹ open at the center, as shown, provided with elongated slots $a^7$, whereby the plate may be adjusted and held in a horizontal plane position by means of bolts $a^8$. By this means the drill-rods I¹⁰ may be caused to bore the button-blanks at any desired angle. The first drilling device in the series is preferably constructed to form the well of the button.

The buffing device J, if employed, serves as a wiper to clean the completed button from the cuttings and dust of the drills.

The shaft A⁹, Fig. 14, is provided with a joint, as indicated at $a^9$, to permit the drilling device to be set at a desired angle to the work, as above described.

The wipers 18 are designed to be of a length sufficient to cause a quarter-rotation of the corresponding chuck at each step of the turret adjacent to the last four drills, so as to bring the button-blank into proper position for the respective holes.

As already described, the belts over the pulleys 12 13 14 15 16 cause the chucks to rotate opposite the grinding and buffing devices.

I would have it understood that I do not limit myself solely to all the specific details of construction herein shown and described.

To drill a less number of holes than those provided for in the machine herewith shown and described, a desired number of the drills may be thrown out of operation in any desired manner.

The interchangeable drills are each held adjacent to the grinding-wheel in a fixed or non-rotatable position, the upper drill only being rotatable on its axis.

It will be perceived by reference to Fig. 11 that the belt 62 is out of contact with the pulley on the lower spindle. To hold each lower spindle in fixed or non-rotatable position while its drill-rod is being ground, any suitable device may be employed—as, for example, a pawl T², (indicated in dotted lines in Fig. 11,) arranged to enter a suitable recess at $t'$ in the pulley on the lower spindle when the pulley has reached the proper position, the pawl locking the lower spindle adjacent to the grinding-wheel. A stationary wiper T³ (indicated in dotted lines in Fig. 11) releases the pawl from the corresponding pulley when the pulleys change positions.

The carrying device or spool I⁵ is arranged to be locked in alternately-reversed position. As shown in Fig. 14 of the drawings, this is accomplished by means of a tapered key $i^8$, attached to the housing $I^4$, the said spool being constructed with a corresponding socket (indicated at $i^9$) to slip over the key as the spool is advanced.

What I claim as my invention is—

1. In a button-making machine, the combination of a series of horizontally-projecting rotatable chucks to hold the button-blanks, means to lock the chucks from rotating on their axes at certain predetermined points of their axial rotation, and a set of operative devices to work upon said blanks, said chucks and said set of operative devices the one being movable relative to the other to bring the work and the several operative devices together in succession, substantially as set forth.

2. In a button-making machine, the combination of a table, and a turret the one being stationary and the other revoluble, said table and turret the one bearing operative devices to work upon the button-blanks, and the other provided with horizontally-projecting rotatable chucks to hold the blanks to the work, and means to lock the chucks from rotating on their axes in desired positions, substantially as set forth.

3. In a button-making machine, the combination of a set of operative devices to work upon the button-blanks embodying feeding, grinding, buffing and drilling mechanisms, a series of horizontally-projecting rotatable chucks to hold the blanks to the work, and means to lock the chucks from rotating on their axes at certain predetermined points of their axial rotation, said chucks and operative devices the one movable relative to the other to bring the work and the several operative devices together in succession, substantially as set forth.

4. In a button-making machine, the combination of a set of operative devices to work upon the button-blanks, embodying feeding, grinding, reversing, buffing and drilling mechanisms, a series of horizontally-projecting rotatable chucks to hold the blanks to the work, and means to lock the chucks from rotating on their axes at certain predetermined points of their axial rotation, said chucks and operative devices the one movable relative to the other to bring the work and the several operative devices together in succession, substantially as set forth.

5. In a button-making machine, the combination of a stationary table, operative devices mounted thereupon for working the button-blanks, a horizontally-revoluble turret located within said table, horizontally-projecting rotatable chucks carried by said turret to hold the button-blanks to the operative devices upon the surrounding table, and means to lock the chucks from rotating on their axes in desired positions, substantially as set forth.

6. In a button-making machine, the combination of a stationary table, a track, a turret rotatable upon said track within said table, operative devices upon said table to work upon the button-blanks, horizontally-projecting chucks carried by said turret to hold the button-blanks to the operative devices upon the surrounding table, and means to lock the chucks from rotating on their axes in desired positions, substantially as set forth.

7. In a button-making machine, the combination of a stationary table, operative devices mounted thereupon for working upon the button-blanks, a revoluble turret within the table, rotatable horizontally-projecting chucks carried by said turret to hold the button-blanks to the operative devices upon the surrounding table, and means to lock the chucks from rotating on their axes in desired positions, said operative devices and said chucks the one arranged to advance toward the other, substantially as set forth.

8. In a button-making machine, the combination of a stationary table, operative devices mounted thereupon for working upon the button-blank, a revoluble turret within the table, having a step-by-step movement, horizontally-projecting rotatable chucks carried by said turret to hold the button-blanks to the operative devices upon the surrounding table, and means to lock the chucks from rotating on their axes in desired positions, substantially as set forth.

9. In a button-making machine, the combination of a stationary table, operative devices mounted thereupon for working upon the button-blanks, a revoluble turret within the table, having a step-by-step movement, horizontally-projecting rotatable chucks carried by said turret to hold the button-blanks to the operative devices upon the surrounding table, means to lock the chucks from rotating on their axes in desired positions, and means to lock said turret at each step-by-step movement, substantially as set forth.

10. In a button-making machine, the combination of a stationary table, grinding, buffing and drilling devices located upon said table, a rotatable turret within said table, horizontally-projecting chucks carried by said turret, to hold the button-blanks to the operative devices upon the surrounding table, means to lock the chucks from rotating on their axes in desired positions, and means to rotate said chucks and said grinding, buffing and drilling devices, substantially as set forth.

11. The drilling device herein described, having in combination two drill-spindles, drill-rods carried by said spindles, a grinding device to sharpen said drill-rods, and means to operate said spindles to bring them alternately to the grinding device and to the work, substantially as specified.

12. The drilling device herein described, having in combination two drill-spindles, a carrying device for said spindles, automatic means to intermittently cause a half-revolution of said carrying device and thereby interchange the positions of said drill-spindles, mechanism to automatically rotate the spindles, and means to lock the spindles in alternately-reversed position, substantially as set forth.

13. In a button-making machine, the combination of a stationary table, drills interchangeable in position located thereon, a rotatable turret within the table, having a step-by-step movement, horizontally-projecting rotatable chucks carried by said turret, means to lock the chucks from rotating on their axes in predetermined positions, means to lock said turret and additional means to lock said drills at each step-by-step movement of the turret, substantially as set forth.

14. In a button-making machine, the combination of a rotatable turret, having a step-by-step movement, rotatable chucks carried by said turret provided with a hollow reciprocatory mandrel or shaft, a sleeve within said mandrel provided with clamping-jaws to hold the button-blanks, means to hold the sleeve in a longitudinally-fixed position, a reciprocatory spindle within said sleeve to eject the blanks, and means to release said jaws at desired intervals, substantially as set forth.

15. In a button-making machine, the combination of a rotatable turret, rotatable chucks carried by said turret, means to lock the chucks at certain predetermined points of their axial rotation, and automatically-operated reciprocatory slides to actuate the jaws of said chucks, substantially as set forth.

16. In a button-making machine, the combination of a rotatable turret, chucks carried thereby, interchangeable in position, said chucks provided with a reciprocatory spindle, a hollow mandrel or shaft, a sleeve within said mandrel provided with a clamping device, said mandrel and said sleeve reciprocatory the one relative to the other, and means to lock the chuck at certain predetermined points of their axial rotation, substantially as set forth.

17. In a button-making machine, the combination of a table, a series of operative devices located thereupon to work upon the button-blanks, arranged in successive order, a plurality of horizontally-projecting rotatable chucks to hold the button-blanks to the operative devices, means to bring said chucks in succession to said operative devices, driving mechanism to actuate said chucks and operative devices, and means to lock the chucks at certain predetermined points of their axial rotation, substantially as set forth.

18. In a button-making machine, the combination of a rotatable turret having a step-by-step movement, chucks carried thereby, means to lock said chucks from rotating on their axes in desired positions, a stationary table, a series of drilling devices carried by said table, each having drill-rods, interchangeable in position, and means to simultaneously lock said table at each step-by-step movement thereof, and the drill-rods at each reversion thereof, substantially as set forth.

19. In a button-making machine, the combination of a rotatable turret having a step-by-step movement, a disk N' upon the axle of the turret, chucks carried by said turret, a stationary table, means to lock said chucks from rotating on their axes in desired positions, a series of drilling devices carried by said table, each having drill-rods, interchangeable in position, means to give a step-by-step movement to said disk, and a device to release and lock said disk at each movement thereof, substantially as set forth.

20. In a button-making machine, the combination of a rotatable turret, horizontally-projecting chucks carried thereby, a surrounding stationary table, a series of drilling devices thereon, grinding and buffing devices located upon said table, and means to lock the chucks from rotating on their axes in position for the blanks carried thereby to be drilled and to unlock said chucks when in position for the grinding and buffing devices to work upon said blanks, substantially as set forth.

21. In a button-making machine, the combination of a rotatable turret, horizontally-projecting chucks carried thereby, a surrounding stationary table, drilling, grinding and buffing devices carried by said table, means to rotate said chucks when opposite the grinding and buffing devices, and to lock said chucks from rotating on their axes when opposite said drilling devices, substantially as set forth.

22. In a button-making machine, the combination of a rotatable turret, horizontally-projecting chucks carried thereby, a surrounding stationary table, drilling devices carried thereby, means to lock said chucks from rotating on their axes when opposite the drilling devices, and to give a partial rotation to said chucks between said drilling devices, substantially as set forth.

23. In a button-making machine, the combination of a rotatable turret, rotatable chucks carried thereby, a surrounding stationary table, drilling, grinding and buffing devices carried by said table, a locking device to control the rotation of each of said chucks upon its axis, and means at desired points to release said locking device and to rotate the chucks when the locking device is released, substantially as set forth.

24. The drilling device herein described provided with two drills, and a grinder to grind said drills, said drills being interchangeable in position to bring them alternately to the grinder and to the work, substantially as set forth.

25. The drilling device herein described, having in combination a spool, two rotatable drills carried by said spool, a grinder, and means to rotate said spool to bring said drills alternately to said grinder and to the work, substantially as set forth.

26. The drilling device herein described having in combination two drills, a grinder, and means to advance said drills to the work, said drills being interchangeable in position to bring them alternately to the grinder and the work, substantially as set forth.

27. The drilling device herein described, having in combination two drill-spindles, sleeves advanceable in said spindles, drill-rods carried in said spindles and sleeves, means to advance said drill-rods to the work, and a grinding device, said spindles being interchangeable in position to bring the drill-rods alternately to the work and to the grinding device, substantially as set forth.

28. The drilling device herein described, having in combination a rotatable spool and rotatable drills carried by said spool, and a grinding device located adjacent to one of said drills, said drills interchangeable in position, to bring the drills alternately to the work and to the grinding device, substantially as set forth.

29. The drilling device herein described, having in combination a horizontal rotatable spool, rotatable drills carried by the spool, and a grinding device located adjacent to the lower drill, said drills interchangeable in position, and said spool advanceable to the work, substantially as set forth.

30. The drilling device herein described having in combination rotatable drills interchangeable in position, means for carrying said drills, and means to adjust the drills at a desired angle, substantially as set forth.

31. The drilling device herein described, having in combination a rotatable spool having a step-by-step movement, rotatable drills carried thereby, interchangeable in position, a grinding device adjacent to one of said drills, and means to lock the spool at each step-by-step movement, substantially as set forth.

32. The drilling device herein described, having in combination, a reciprocatory spool, two drills carried by said spool, interchangeable in position, means to alternately sharpen said drills, substantially as set forth.

33. The drilling device herein described, having in combination a rotatable spool having a step-by-step movement, rotatable drills carried thereby, an agitatable grinding device, means to lock the spool at each step-by-step movement thereof, whereby said drills may be brought alternately to the grinding device and to the work, said spool being adjustable to bring the drills to the work at a desired angle, substantially as set forth.

34. In a button-making machine, the combination of a horizontal rotatable turret, a horizontal stationary table surrounding said turret, operative devices carried by said table, and chucks carried by said turret, each of said chucks having a reciprocatory hollow mandrel or shaft, a sleeve within said mandrel provided with jaws to clamp a button-blank, means to hold the sleeve from longitudinal movement, and a reciprocatory spindle within said sleeve, substantially as set forth.

35. In a button-making machine, the combination of a stationary table, a revoluble turret within the table, chucks located upon said turret, means to lock said chucks from rotating on their axes in desired positions, a rotatable feed-wheel located upon the table, plungers or spindles within said wheel, and means to advance the feed-wheel to the chucks and to actuate said plungers, substantially as set forth.

36. In a button-making machine, the combination of a stationary table, a rotatable feed-wheel thereupon, a revoluble turret within the table, chucks located upon said turret, means to lock said chucks from rotating on their axes in desired positions, plungers within said wheel, a carriage located upon said table carrying the feed-wheel, and means to advance the carriage, and to actuate the said plungers, substantially as set forth.

37. The feeding mechanism herein set forth having in combination a rotatable feed-wheel, plungers within said wheel, a carriage carrying said feed-wheel, and an oscillatory arm arranged to first advance said carriage and then to actuate said plunger, substantially as set forth.

38. The feeding mechanism herein set forth having in combination a rotatable feed-wheel having a step-by-step movement, plungers within said wheel, a carriage carrying said feed-wheel, and an oscillatory arm arranged to advance said carriage and to actuate said plungers, substantially as set forth.

39. The feeding mechanism herein set forth having in combination a rotatable feed-wheel, gears to rotate said feed-wheel, plungers within said feed-wheel, a carriage carrying said wheel and gears, an oscillatory arm to advance said carriage and to actuate said plungers, and means to give a step-by-step movement to said gears, substantially as set forth.

40. The feeding mechanism herein set forth having in combination a feed-wheel, gears to rotate said wheel, plungers within said wheel, a carriage carrying said wheel and gears, a cam-actuated pawl to give a step-by-step movement to said gears, and a cam-actuated oscillatory arm to advance said carriage and to actuate said plungers, substantially as set forth.

41. The reversing mechanism herein set forth having in combination, a vertically-rotatable button-blank-holding device, means to advance said device to the work and to retract it therefrom, and to reverse said button-holding device, and a horizontally-reciprocatory plunger, all arranged substantially as and in the manner described.

42. The reversing mechanism herein set forth, having in combination a vertically-rotatable ring to receive a button-blank, means to advance said ring to the work and to retract it therefrom, and a reciprocatory plunger advanceable within said ring and retractable therefrom, substantially as and in the manner described.

43. The reversing mechanism herein set forth having in combination a vertically-rotatable ring to receive a button-blank, means to move the ring forward and backward to and from the work, and to reverse the ring, a plunger or spindle advanceable within the ring and retractable therefrom, and means to move the plunger forward and backward, said plunger movable forward into the ring and backward therefrom before the reversion of the ring, and again movable forward into the ring after the reversion of the ring, substantially as and for the purpose described.

44. The reversing mechanism herein set forth having in combination a split ring to receive a button-blank and exert a tension upon the periphery thereof, a vertical rotatable spindle carrying said ring, means to move the ring forward and backward and to rotate the ring, and a reciprocatory plunger horizontally advanceable into the ring and retractable therefrom, substantially as and in the manner described.

45. The reversing mechanism herein set forth having in combination a reciprocatory housing or carriage, a reversible ring, a vertical rotatable spindle carrying said ring, and a horizontally-reciprocatory plunger carried thereby, said plunger movable forward into the ring and backward therefrom, substantially as and in the manner described.

46. The reversing mechanism herein set forth having in combination a reciprocatory housing or carriage, a reversible ring, gears to reverse the ring, cam mechanism to actuate said gears, a plunger to advance into said ring and retractable therefrom, and cam-actuated mechanism to reciprocate said plunger, substantially as and in the manner described.

47. A drilling device having a step-by-step movement, embodying in combination drill-rods advanceable at each step-by-step movement, a rotatable spool carrying said drill-rods, and a grinding device, said drill-rods interchangeable in position to bring them alternately to said grinding device, substantially as set forth.

48. A drilling device having two advanceable drill-rods interchangeable in position, a rotatable spool carrying said drill-rods, a spindle intermediate said drill-rods connected with each of said drill-rods, ratchets 69 and 70, having a different number of teeth to cause a differential feed of the spindle to advance said drill-rod, and means to intermittently cause a half-revolution of said spool and thereby interchange the positions of said drill-rods, substantially as set forth.

49. A drilling device having in combination advanceable drill-rods interchangeable in position, a spindle connected with said drill-rods, means to sharpen the drill-rods, and a differential feed to advance the spindle and drill-rods, substantially as set forth.

50. A drilling device having in combination a rotatable spool provided with drill-rods, interchangeable in position, a hub engaged with said spool, a threaded spindle connected with said drill-rods and engaging said hub, and a differential feed to advance said spindle and drill-rods, substantially as set forth.

51. In a button-making machine, the combination of a rotatable turret, a plurality of rotatable chucks carried thereby, means to lock the chucks at certain predetermined points of their axial rotation, and means to automatically feed the button-blanks to said chucks one after another, substantially as set forth.

52. In a button-making machine, the combination of a rotatable turret, a plurality of rotatable chucks carried thereby to hold the button-blanks, means to lock the chucks from rotating on their axes in desired positions, and means to reverse the button-blanks carried by said chucks, substantially as set forth.

53. In a button-making machine, the combination of a stationary table, a rotatable turret, having a step-by-step movement and surrounded by said table, multiple chucks carried by said turret, means to lock said chucks from rotating on their axes in desired positions, a feeding device to feed the button-blanks to said chucks, grinding and buffing devices, drilling devices to drill said blanks, and means to discharge the button-blanks from the chucks, the feeding, grinding, buffing and drilling devices arranged upon said table adjacent to the turret, whereby the blanks may be carried by the chucks from one to another of said devices in succession to complete the work upon the button-blanks, substantially as set forth.

54. In a button-making machine, the combination of a rotatable turret, a plurality of chucks carried thereby to hold the button-blanks, means to lock said chucks from rotating on their axes at desired positions, and reversing mechanism to reverse the button-blanks in said chucks, substantially as set forth.

55. In a button-making machine, the combination of a rotatable turret, a plurality of chucks carried thereby to hold the button-blanks, means to lock said chucks from rotating on their axes in certain predetermined positions, and a cutting or grinding device arranged adjacent to the turret whereby the blanks may be operated upon by the grinding or cutting device one after another, substantially as set forth.

56. The drilling device herein described, having in combination two rotatable drill-spindles, interchangeable in position, a grinder adjacent to one of said spindles, and means to lock the spindle adjacent to the grinder to prevent its rotation while being ground, substantially as set forth.

57. In a button-making machine, the combination of a series of rotatable chucks to hold the button-blanks, an automatic numbering device, and means to lock the chucks from rotating on their axes in connection with said device, at certain predetermined points of their axial rotation, substantially as set forth.

58. In a button-making machine, the combination of a series of rotatable chucks to hold the button-blanks, a series of drills located in successive order, said chucks and said drills the one being movable relative to the other to bring the work and the drills into operative position, means to rotate the chucks between two adjacent drills, and to lock said chucks from rotating on their axes in certain predetermined points of their axial rotation in front of the drills, substantially as set forth.

59. In a button-making machine, a rotatable chuck having in combination, a hollow mandrel, a sleeve within said mandrel provided with clamping-jaws to hold the button-blanks, a reciprocatory spindle within said sleeve to eject the blanks, and means to release said jaws at desired intervals, said spindle provided with a head forming a support for the back of the button-blank, whereby any chipping of said back will be prevented in the act of drilling the blank, substantially as described.

60. The drilling device herein described, having in combination two drill-spindles, a carrying device for said spindles, automatic means to intermittently cause a half-revolution of said carrying device and thereby interchange the positions of said drill-spindles, mechanism to automatically rotate the spindles, means to lock the carrying device in alternately-reversed position, and means to also lock the spindles in alternately-reversed position, substantially as set forth.

61. The drilling device herein described, having in combination two drill-spindles, a carrying device for said spindles, a grinding device, automatic means to intermittently cause a half-revolution of said carrying device and thereby interchange the positions of said drill-spindles, mechanism to automatically rotate the spindles, and means to lock the spindle adjacent to the grinding device from rotating on its axis, substantially as described.

In testimony whereof I sign this specification in the presence of two witnesses.

WILLIAM A. PENDRY.

Witnesses:
N. S. WRIGHT,
O. B. BAENZIGER.